United States Patent [19]

Manz et al.

[11] Patent Number: 5,033,271

[45] Date of Patent: Jul. 23, 1991

[54] REFRIGERANT RECOVERY AND PURIFICATION SYSTEM

[75] Inventors: Kenneth W. Manz, Paulding; Roger D. Shirley, W. Unity, both of Ohio

[73] Assignee: Kent-Moore Corporation, Warren, Mich.

[21] Appl. No.: 577,336

[22] Filed: Sep. 4, 1990

Related U.S. Application Data

[62] Division of Ser. No. 528,252, May 24, 1990, which is a division of Ser. No. 319,618, Mar. 3, 1989, Pat. No. 4,938,031, which is a division of Ser. No. 204,675, Jun. 9, 1988, Pat. No. 4,809,520, which is a division of Ser. No. 117,098, Nov. 4, 1987, Pat. No. 4,768,347.

[51] Int. Cl.$^5$ ............................................. F25B 43/00
[52] U.S. Cl. .......................................... 62/125; 62/474
[58] Field of Search .................. 62/474, 85, 195, 125, 62/129; 137/544; 210/195.1, 257.1

[56] References Cited

U.S. PATENT DOCUMENTS

| | | |
|---|---|---|
| 2,341,430 | 2/1944 | Elsey ........................................ 62/77 |
| 2,506,806 | 5/1950 | Metzger ............................. 62/474 X |
| 2,600,435 | 6/1952 | Shapiro .............................. 62/474 X |
| 3,145,544 | 8/1964 | Weller ................................... 62/195 |
| 4,465,593 | 8/1984 | Wemhoff ....................... 210/195.1 X |
| 4,967,570 | 11/1990 | Van Steenburgh, Jr. ......... 62/473 X |

Primary Examiner—William E. Tapolcai
Attorney, Agent, or Firm—Barnes, Kisselle, Raisch, Choate, Whittemore & Hulbert

[57] ABSTRACT

A refrigerant recovery system which includes a compressor having an input coupled through an evaporator and through a solenoid valve to the refrigeration system from which refrigerant is to be withdrawn, and an output coupled through a condenser to a refrigerant storage container. The evaporator and condenser are contained within a closed cylindrical canister for heat exchange and oil separation, the canister having an oil drain valve in the bottom. The refrigerant storage container is carried by a scale having a limit switch coupled to control electronics to prevent or terminate further refrigerant recovery when the container is full. The entire system, including the control electronics, is mounted on a two-wheel hand truck to facilitate transport to a job site such as a building air conditioning or heat pump system. Apparatus for purifying recovered refrigerant includes a replaceable core filter/dryer, and a liquid pump for circulating refrigerant from the liquid port of the storage container through the core and then to the container vapor port. A differential pressure gauge is connected across the filter/dryer to indicate need for core replacement. A moisture indicator displays water concentration in the refrigerant. The purification apparatus may be either separate from or combined with the recovery system.

5 Claims, 5 Drawing Sheets

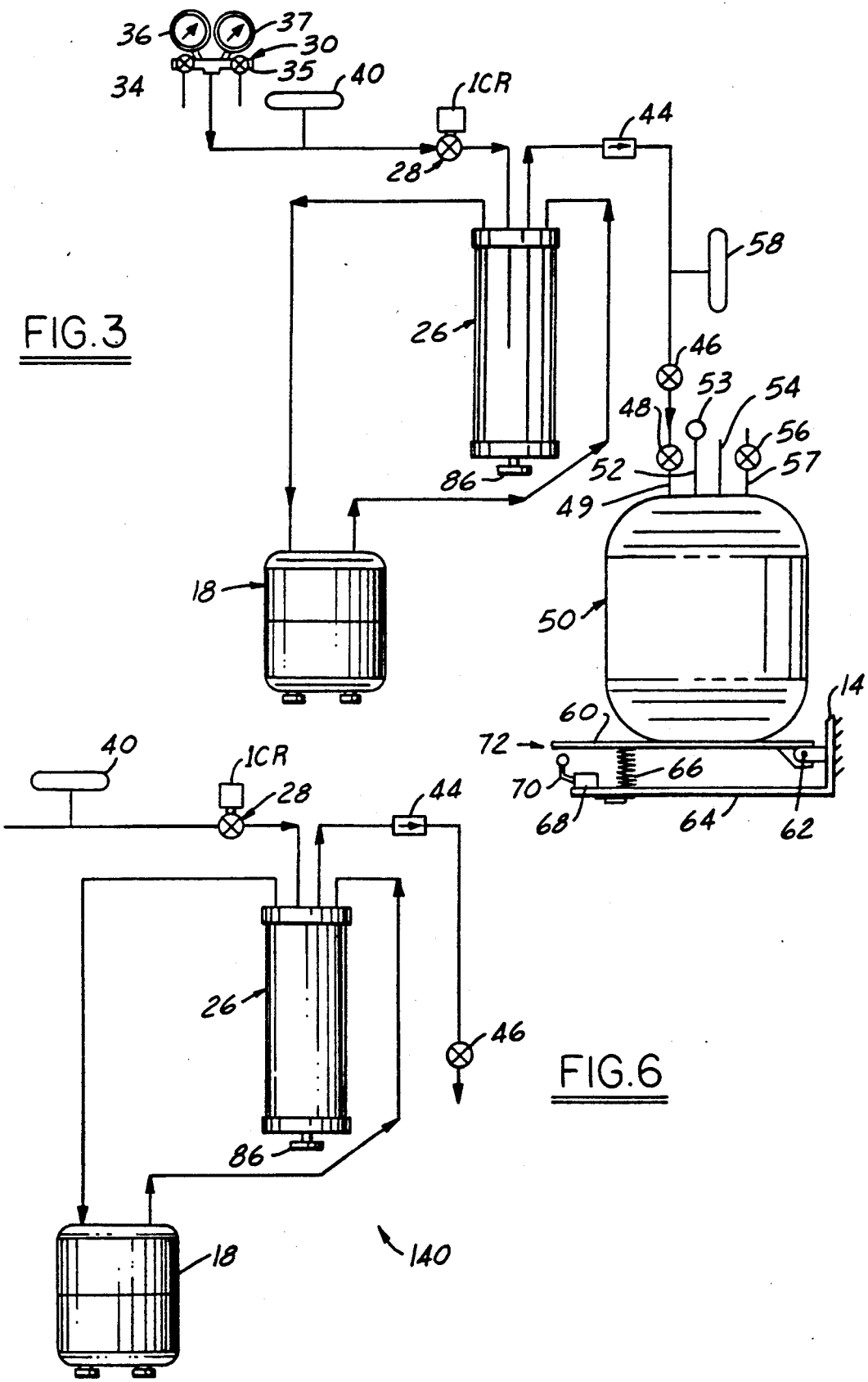

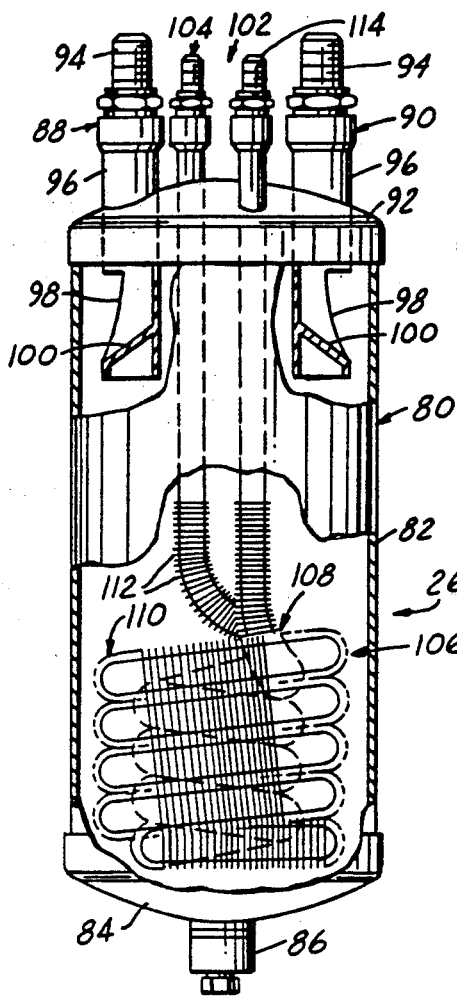

REFRIGERANT RECOVERY AND PURIFICATION SYSTEM

This application is a division of U.S. application Ser. No. 07/528,252 filed May 24, 1990, which was a division of U.S. application Ser. No. 07/319,618 filed Mar. 3, 1989, now U.S. Pat. No. 4,938,031, which was a division of U.S. application Ser. No. 07/204,675 filed June 9, 1988, now U.S. Pat. No. 4,809,520, which was a division of U.S. application Ser. No. 07/117,098 filed Nov. 4, 1987, now U.S. Pat. No. 4,768,347.

The present invention is directed to devices for recovery, purification and/or storage of used refrigerant from refrigeration systems such as air conditioning and heat pump systems.

BACKGROUND AND OBJECTS OF THE INVENTION

Many scientists contend that release of halogen refrigerants into the atmosphere deleteriously affects the ozone layer which surrounds and protects the earth from ultraviolet solar radiation. Recent international discussions and treaties, coupled with related regulations and legislation, have renewed interest in devices for recovery and storage of used refrigerants from refrigeration systems for later purification and reuse or for proper disposal. U.S. Pat. No. 4,261,178, assigned to the assignee hereof, discloses a refrigerant recovery system in which the input of a compressor is coupled through an evaporator and through a manual valve to the refrigeration system from which refrigerant is to be recovered. The compressor output is connected through a condenser to a refrigerant storage container. The condenser and evaporator are combined in a single assembly through which cooling air is circulated by a fan. Content of the storage container is monitored by a scale on which the container is mounted for sensing weight of liquid refrigerant in the container, and by a pressure switch coupled to the fluid conduit between the condenser and the container for sensing vapor pressure within the storage container. A full-container condition sensed at the scale or a high-pressure condition sensed at the pressure switch terminates operation of the compressor motor. A vacuum switch is positioned between the inlet valve and the evaporator for sensing evacuation of refrigerant from the refrigeration system and automatically terminating operation of the compressor motor.

Although the system so disclosed represents a significant advance over previous refrigerant recovery devices, further improvement remains desirable. It is an object of the present invention to provide a refrigerant recovery system of the described character which may be readily transported to a job site, such as a building air conditioning or heat pump system, which may be operated at such job site to evacuate and store used refrigerant for later purification or disposal, and which may be readily physically manipulated and operated by a single relatively unskilled operator. Another object of the invention is to provide a refrigerant recovery system of the described character which is economical to fabricate and assemble, which is reliable over an extended operating life, and in which the various system components are readily accessible for repair or replacement as required. In furtherance of the foregoing objectives, particularly as they relate to portability and size reduction, it is another and more specific object of the invention to provide a combined heat-exchange/oil-separation unit which will vaporize incoming refrigerant fed to the compressor input, liquify refrigerant fed from the compressor output to the storage container and remove oil from the refrigerant, all without requiring auxiliary air circulation or cooling as by a separate fan or the like.

Another object of the present invention is to provide apparatus for purifying recovered refrigerant which is economical, reliable, portable and easy to operate. A further object of the invention is to provide a combined refrigerant recovery and purification apparatus.

SUMMARY OF THE INVENTION

In accordance with one important aspect of the present invention, in a refrigerant recovery system of the character previously described and shown, for example, in the above-noted U.S. Patent, the refrigerant evaporator, condenser and oil separator are combined in a single integral assembly within a closed canister having a top wall, a bottom wall and a substantially cylindrical sidewall. The evaporator inlet and outlet are positioned in the canister for feeding and withdrawing refrigerant from within the canister adjacent to the canister top wall. Likewise, the condenser inlet and outlet are positioned at the canister top wall and coupled to a condenser coil which extends within the canister from the condenser inlet to adjacent the canister bottom wall, and thence to the condenser outlet. An oil drain is positioned in the canister bottom wall. In the preferred embodiment of the invention, the condenser coil comprises a pair of coaxially internested coils connected to each other adjacent to the bottom wall and having substantially identical axial lengths not more than one-half of the axial length of the canister. Heat-exchange fins integrally radially outwardly project from the condenser coils. The evaporator inlet includes a baffle and lateral opening for directing incoming refrigerant radially outwardly against the canister sidewall within the canister volume, and the evaporator outlet includes a similar baffle for receiving evaporated refrigerant from adjacent a diametrically opposed surface of the canister sidewall. The canister bottom wall most preferably is dished to enhance oil collection at the oil drain.

In accordance with another important aspect of the present invention, the refrigerant recovery system comprises a self-contained assembly carried on a wheeled support, most preferably a two-wheel hand truck. The refrigerant container is carried by a scale mounted on the wheeled support for indicating a full-container condition. Circuitry for implementing automatic refrigerant recovery is carried by the wheeled support and includes a solenoid valve for selectively admitting refrigerant to the evaporator, circuitry responsive to an operator for selectively applying electrical power to the solenoid valve and to the compressor, a pressure sensor at the evaporator inlet, and circuitry responsive thereto for removing power from the solenoid valve and compressor upon completion of an evacuation operation. The scale on which the recovered refrigerant container is mounted includes a switch for inhibiting such automated refrigerant recovery operation when the container is full.

In accordance with a further aspect of the invention, apparatus is provided for purification of refrigerant so recovered. In one embodiment, the purification apparatus is a stand-alone unit which comprises a liquid pump and a filter/dryer mounted in a portable stand. The pump draws recovered refrigerant from the liquid port of the storage container through the filter/dryer, and returns refrigerant to the container vapor port. The filter/dryer has a replaceable core, and a differential pressure gauge is connected across the filter/dryer for indicating need for core replacement. A moisture indicator is connected between the pump output and the storage container for indicating to an operator that the refrigerant has been purified. Refrigerant in the container can then be reused for charging air conditioning systems using, for example, charging apparatus of the character disclosed in U.S. Pat. No. 4,688,388 assigned to the assignee hereof. In a second embodiment, the purification apparatus and recovery system are combined in a single stand-alone portable unit.

BRIEF DESCRIPTION OF THE DRAWINGS

The invention, together with additional objects, features and advantages thereof, will be best understood from the following description, the appended claims and the accompanying drawings in which:

FIG. 3 is a schematic diagram of the refrigerant recovery system of FIGS. 1 and 2;

FIG. 4 is a partially sectioned elevational view of the heat-exchange/oil-separation unit utilized in the system of FIGS. 1-3;

FIG. 5 is an electrical schematic diagram of the control electronics in the system of FIGS. 1-2;

FIG. 6 is a schematic diagram similar to that of FIG. 3 but illustrating a modified embodiment of the invention;

FIG. 10 is a front elevational view of a combined recovery and purification system in accordance with a further embodiment of the invention;

DETAILED DESCRIPTION OF PREFERRED EMBODIMENTS

Figure 1:
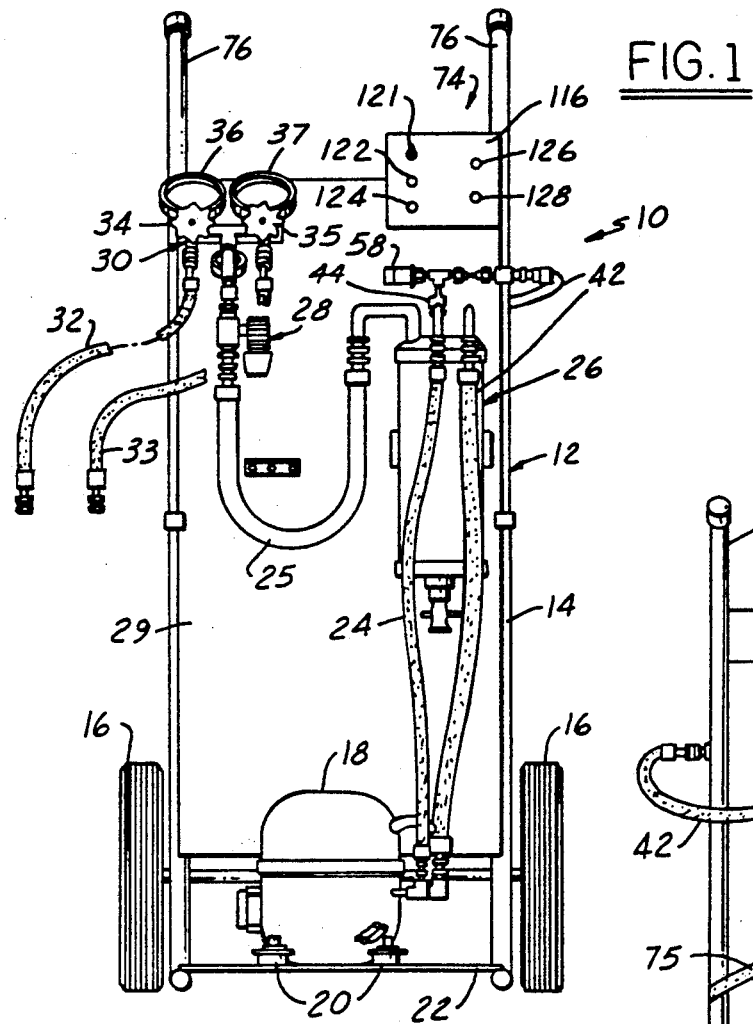
FIG. 1 is a front elevational view of a self-contained portable refrigerant recovery and storage system in accordance with a presently preferred embodiment of the invention.
Figure 2:
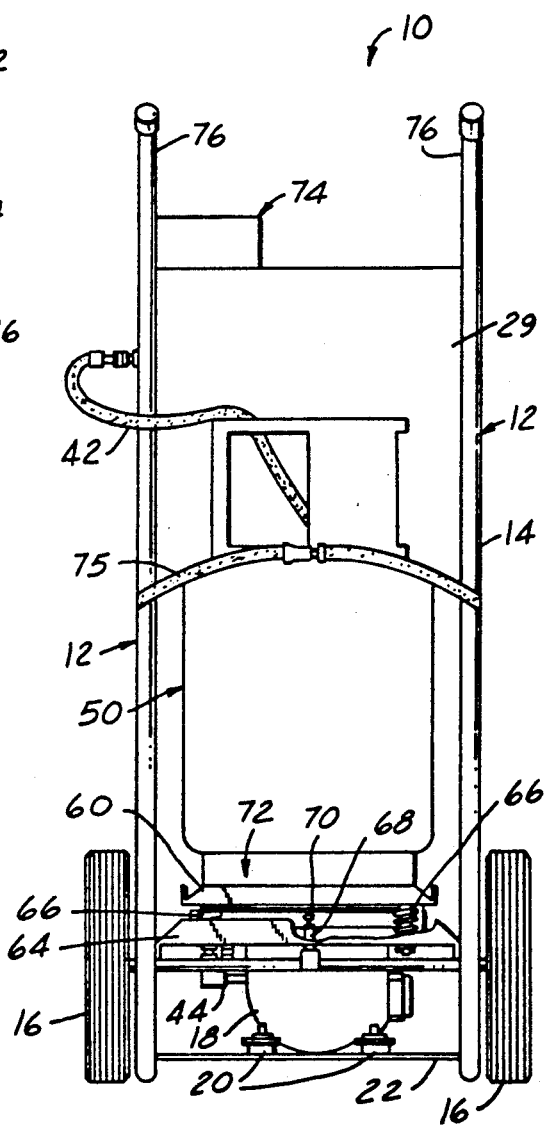
FIG. 2 is a rear elevational view of the system of FIG. 1.

FIGS. 1-3 illustrate a presently preferred embodiment of a refrigerant recovery and storage system 10 in accordance with the present invention as comprising a hand truck 12 which includes a vertical frame 14 supported by a pair of wheels 16. A compressor 18 is carried by the shock-mounts 20 on a forwardly extending base 22 of frame 14. Compressor 18 has an inlet which is coupled by the conduit 24, 25 through the evaporator section of a combined heat-exchange/oil-separation unit 26 mounted on the vertically-extending panel 29 of frame 14 above compressor 18, and through a conduit 25 and an electrically operated solenoid valve 28 to an input manifold 30. Manifold 30 is mounted on panel 29 adjacent to unit 26, and includes a pair of hoses 32, 33 for connection to the high pressure and low pressure sides of a refrigeration system from which refrigerant is to be recovered. Manifold 30 also has the usual manual valves 34, 35 and pressure gauges 36, 37. A pressure switch 40 (FIG. 3) is connected between solenoid valve 28 and the evaporator portion of heat-exchange/oil-separation unit 26, and is responsive to a predetermined low pressure to the compressor input from the refrigeration system to indicate removal of refrigerant therefrom.

The outlet of compressor 18 is connected by the conduits 42 through the condenser portion of heat-exchange/oil-separation unit 26, through a check valve 44 and through a pair of manual valves 46, 48, in series, to the vapor inlet port 49 (FIG. 3) of a refillable refrigerant storage container 50. Container 50 is of conventional construction and includes a second port 52 for coupling to a suitable fill level indicator 53, a pressure relief port 54, and a manual liquid valve 56 connected to a liquid port 57. A suitable container 50 is marketed by Manchester Tank Company under the trademark "ULTRALINE" and includes valves 48, 56, a pressure relief valve at port 54 and a fill indicator 53 coupled to port 52 as part of the overall assembly. A pressure switch 58 is connected in line between check valve 44 and manual valve 46, and is responsive to vapor pressure within container 50 with valves 46, 48 open to indicate an excessive vapor pressure of predetermined level therewithin.

Storage container 50 is carried on a platform 60 which is pivotally mounted by the hinge pin 62 to the back side of truck frame 14. A flat horizontal base 64 projects rearwardly from frame 14 beneath platform 60, and a pair of coil springs 66 are captured in compression between platform 60 and base 64 at an edge of platform 60 spaced from frame 14. A limit switch 68 is mounted on base 64 and has a switch-actuating arm 70 which projects upwardly therefrom for engagement with the frame-remote edge of platform 60. Platform 60, hinge 62, frame 14, base 64, springs 66 and limit switch 68 thus form a scale 72 in which limit switch 68 is effectively responsive to a predetermined weight of refrigerant within container 50 to indicate a full container condition to the control electronics 74 (FIGS. 1 and 5). Weight sensed by limit switch 68 is adjustable through selection of or bias on spring 66 and/or positioning of switch actuator 70. A strap or belt 75 (FIG. 2) holds container 50 on truck 12 when the latter is tilted rearwardly by handles 76 for transport.

FIG. 4 illustrates heat-exchange/oil-separation unit 26 in greater detail as comprising a canister 80 having a closed or imperforate generally cylindrical sidewall 82 and an outwardly dished bottom 84 having a manual oil drain valve 86 centrally positioned therein. The evaporator portion of unit 26 includes an inlet fitting 88 and an outlet fitting 90 carried by the outwardly concaved top 92 of canister 80. Inlet fitting 88 comprises the threaded nipple 94 coupled to the hollow pipe 96 which has an opening 98 facing laterally outwardly toward canister sidewall 82 immediately beneath top 92. A slanted or sloped deflector or baffle 100 forces incoming refrigerant laterally outwardly beneath the canister top into the open internal volume of canister 80. Similarly, outlet fitting 90 has a threaded nipple 94 and a pipe 96, with the side opening 98 and baffle 100 oriented laterally diametrically oppositely of the identical opening in inlet fitting 88 for receiving and feeding refrigerant from the open volume of canister 80 to the inlet of compressor 18.

The condenser portion of unit 26 includes an inlet fitting 102 and an outlet fitting 104 interconnected within canister 80 by a continuous length of tubing or conduit which forms a closed condenser coil 106. More specifically, coil 106 includes an inner coil 108 coupled at its upper end to inlet fitting 102, and an outer coil 110 coupled at its upper end to outlet fitting 104 Coils 108, 110 are tightly formed spirals or helices coaxially internested and integrally connected to each other at their lower ends adjacent to canister bottom 84. Coil 106 is thus suspended from canister top 92 by the lengths of coil conduit coupled to fittings 102, 104 while being spaced from the canister side and bottom walls, with the convolutions of each coil 108, 110 occupying less than one-half of the overall axial dimension of canister 80. The conduit which forms condenser coil 106 is preferably of copper or other suitable construction and has heat exchange fins integrally radially outwardly projecting therefrom. Each fitting 102, 104 includes a threaded nipple 114.

In operation of heat-exchange/oil-separation unit 26, incoming liquid or mixed liquid and vapor refrigerant from the refrigeration system being evacuated is fed through fitting 88, with the liquid refrigerant falling by gravity onto and around coil 106. At the same time, vapor from the compressor outlet is fed through condenser inlet 102 to coil 106, where heat is lost from the compressed refrigerant vapor and transferred to the liquid refrigerant which externally surrounds coil 106. Such heated liquid refrigerant is evaporated and drawn through evaporator outlet 90 to the compressor input. In the meantime, the compressor output is liquified by heat loss in condenser coil 106 and fed through condenser outlet 104 to storage container 50 (FIGS. 1-3). Oil entrained in incoming liquid refrigerant is not revaporized in the evaporator portion of unit 26, but pools in liquid phase at dished bottom 84 of unit 26 and may be removed as desired through valve 86.

FIG. 5 is a schematic diagram of control electronics 74 carried behind an operator panel 116 (FIG. 1) mounted to truck frame 14 above unit 26. Recovery pressure switch 40, scale switch 68 and tank pressure switch 58 are connected in series with an operator power switch 121 (FIGS. 1 and 5), an operator start-cycle pushbutton 122 and the coil of a control relay 1CR across a 120 VAC source of electrical power. A first set of normally-open contacts 1CR-1 of control relay 1CR is connected across operator start-cycle pushbutton 122. A second set of normally-open contacts 1CR-2 is connected in series with power switch 121 and compressor 18 across 120 VAC. The solenoid 2CR of valve 28 is connected across compressor 18, as is the compressor-on lamp 124 (FIGS. 1 and 5). A full-tank lamp 126 is connected across scale switch 68, and a high-pressure lamp 128 is connected across pressure switch 58. A resistor 130 is connected across switch 40, the coil of relay 1CR and push button 122 to provide a current path for lamps 126, 128.

In operation of the overall system 10, hoses 32 are first connected to the refrigeration system to be evacuated in the usual manner, and one or both valves 34, 35 are opened. Scale switch 68 is normally closed, and assumes an open condition when actuator arm 70 is engaged by platform 60. Pressure switch 58 is normally closed, and assumes an open condition when the vapor pressure within container 50 exceeds the switch threshold level. Recovery pressure switch 40 is likewise normally closed, and assumes an open condition when the pressure to the compressor input from the refrigeration system decreases below the switch pressure level. With power switch 121 closed to apply power to the system, the operator depresses pushbutton 122 to begin a recovery cycle, whereupon the coil of control relay 1CR is energized through closed switches 40, 58, 68, 121 and 122. Contact set 1CR-1 closes to maintain a current path through the coil of relay 1CR when pushbutton 122 is released. Likewise, contact set 1CR-2 closes to apply power to compressor 18 and solenoid valve 28 to open the solenoid valve and energize the compressor. Liquid refrigerant is then withdrawn from the refrigeration system through the evaporator stage of unit 26, compressed by compressor 18, reliquified at the condenser stage of unit 26, and fed to storage container 50. When substantially all of the refrigerant has been withdrawn from the refrigeration system, recovery pressure switch 40 opens, relay 1CR is de-energized, and power is removed from compressor 18 and solenoid valve 28. In the event that platform 60 engages scale switch 68 to indicate a full condition at storage container 50, switch 68 opens and lamp 26 is illuminated, either through switch 58 and resistor 130 or through lamp 128 and resistor 130. Likewise, if high tank vapor pressure opens switch 58, lamp 128 is illuminated through resistor 130 and either lamp 126 or switch 68. In either event, the open condition of switch 58 and/or 68 prevents energization of relay 1CR independently of operator pushbutton 122. Opening of either switch 58 or 68 during a recovery cycle will de-energize relay 1CR and thereby terminate the cycle.

FIG. 6 illustrates a simplified refrigerant recovery system 140 in accordance with a modified embodiment of the invention for use with a separately-provided storage container (not shown). System 140 includes solenoid valve 28 which is directly coupled to the refrigeration system, recovery pressure switch 40, heat-exchange/oil-separation unit 26, compressor 18, check valve 44 and manual valve 46 for feeding liquid refrigerant to such separately-provided storage container. Control electronics for system 140 of FIG. 6 is similar to that illustrated in FIG. 5, but with switches 68, 58, lamps 126, 128 and resistor 130 eliminated. The advantage of system 140 is that the same is of such compact structure as to be contained within a portable suitcase-like enclosure which may be readily transported by the operator to the job site along with a separate storage container.

Figures 7, 8:
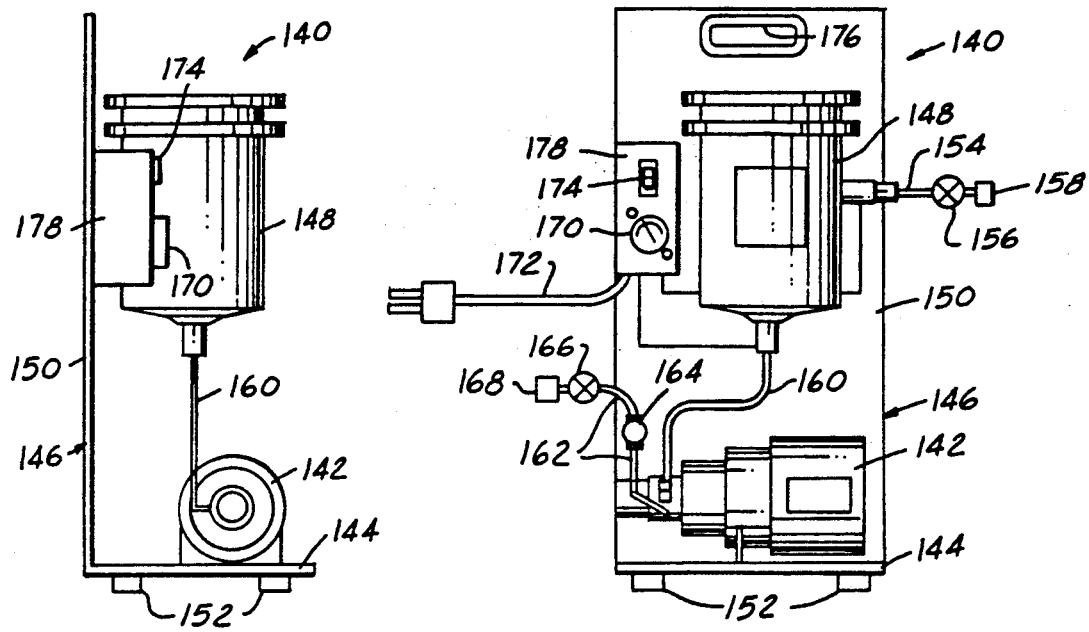
FIG. 7 is a front elevational view of a refrigerant purification system in accordance with another embodiment of the invention.
FIG. 8 is a side elevational view of the system of FIG. 7.
Figure 9:
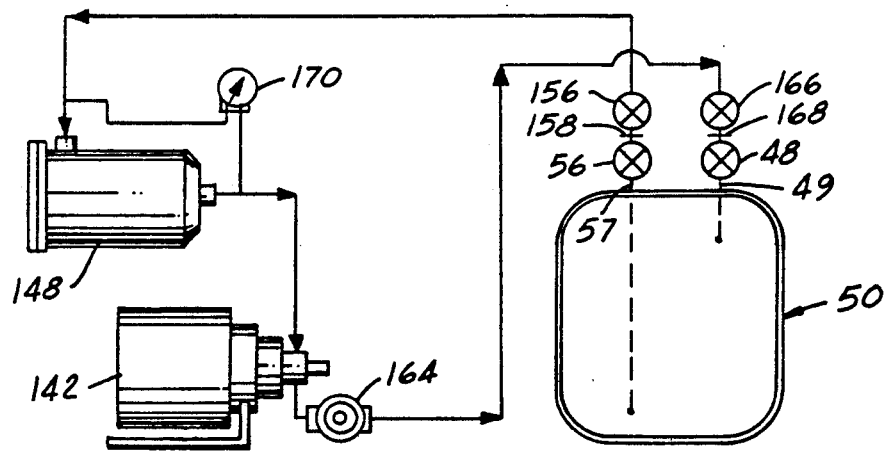
FIG. 9 is a schematic diagram of the purification system of FIGS. 7 and 8 in operation.

FIGS. 7-9 illustrate a stand-alone device 140 for purification of recovered refrigerant within storage container 50. A liquid pump 142 is mounted on the base 144 of an L-shaped stand 146. A replaceable core filter/dryer unit 148 of any suitable conventional type is mounted on the back 150 of stand 146 above pump 142. Stand 146 rests on the rubber mounts 152. A hose 154 extends from the inlet of unit 148 through a manual valve 156 to a coupling 158 for connection to the liquid port 57 of container 50 at valve 56. The outlet of unit 148 is connected by the hose 160 to the inlet of pump 142, and the outlet of pump 142 is connected by the hoses 162 through a moisture indicator 164 and a manual valve 166 to a coupling 168 for connection to the vapor port 49 of container 50 at valve 48. A differential pressure gauge 170 is connected across filter/dryer unit 148. Electrical power is selectively applied to pump 142 through a power cord 172 and an operator power switch 174. An elongated opening 176 at the upper edge of back 150 permits manual grasping and transportation of the entire device 140. i.e., Gauge 170 and switch 174 are mounted within a housing 178 fastened to back 150 of stand 146 adjacent to unit 148.

In operation, the operator first attaches couplings 158, 168 to container 50, and then opens valves 48, 56, 156, 166. Power is then applied to pump 142 through switch 174, and liquid is drawn from the lower portion of container 50, circulated through filter/dryer unit 148 and pump 142, and returned to the upper portion of container 50 at vapor port 49. This process continues until moisture indicator 164 indicates removal of all moisture from the refrigerant, at which time operation is terminated and container 50 disconnected. The refrigerant within container 50 is then ready for reuse to recharge refrigeration systems. Suitable recharge apparatus is disclosed in U.S. Pat. No. 4,688,388 assigned to the assignee hereof. When differential pressure gauge 170 indicates a pressure drop across unit 148 above a preselected threshold, which may be marked on the indicator, the operator replaces the filter/dryer core of unit 148.

Figure 11:
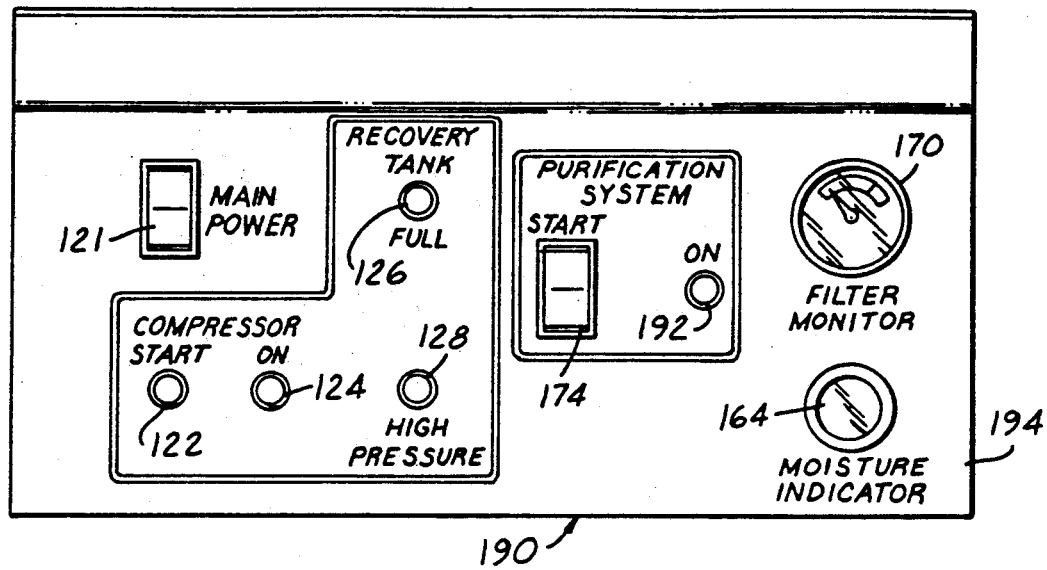
FIG. 11 is a plan view of the control panel in the system of FIG. 10.
Figure 12:
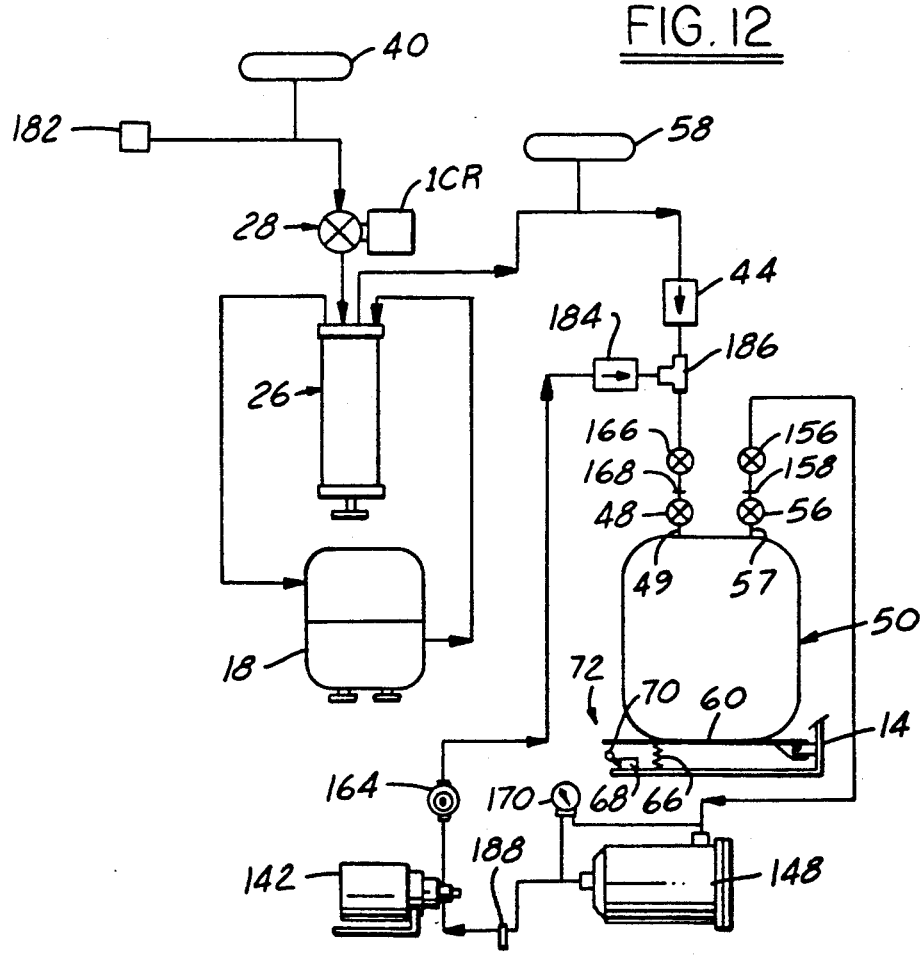
FIG. 12 is a schematic diagram of the system of FIGS. 10-11.

FIGS. 10-12 illustrate a combined recovery/purification system 180 in accordance with yet another embodiment of the invention. System 180 includes many components of system 10 (FIGS. 1-5) and 140 (FIGS. 7-9) hereinabove described in detail, with identical reference numerals indicating correspondingly identical elements. In system 180, a single input coupling 182 (FIG. 12) replaces manifold 30 (FIGS. 1 and 3). Pump 142 is mounted on base 22 adjacent to compressor 18, and filter/dryer unit 148 is mounted on frame back panel 29 above pump 142. The outlet of pump 142 is fed through moisture indicator 164 and through a check valve 184 (FIG. 12) to a T-coupler 186 connected between check valve 44 and valve 156. A pressure relief valve 188 is connected between the outlet of filter/dryer unit 148 and the inlet of pump 142. Heat-exchange/oil-separation unit 26, valves 28, 44, 184 and 188, and pressure switches 40, 58 are contained within an enclosure 190 mounted on frame 14. The operator controls and indicators —i.e., switches 121, 122, 174, lamps 124, 176, 128, gauge 170, moisture indicator 164 and a purification pump power lamp 192 —are mounted on a sloping control panel 194 of enclosure 190 and are suitably labeled as shown in FIG. 11 for ease of use.

It will be appreciated that the refrigerant recovery and purification sections of the combined system of FIGS. 10-12 can be operated individually as hereinabove described in detail. It is intended that the refrigerant recovery section of the combined unit be employed until container 50 is full. The purification section may then be operated until the recovered refrigerant is purified, at which time container 50 may be replaced with an empty container. Purification of a full container should take about one hour. Tank-full switch 68 and pressure switch 58 do not inhibit operation of the purification apparatus. Furthermore, the recovery and purification sections of the combined unit may be operated simultaneously, although such operation would lengthen recovery time.

The invention claimed is:

1. Apparatus for purification of refrigerant within a storage container having separate liquid and vapor ports, said apparatus comprising filter/dryer means for removing water from refrigerant passing therethrough, a liquid refrigerant pump, means for removably connecting said filter/dryer means and said pump to said ports to circulate liquid refrigerant in a closed path from said liquid port through said filter/dryer means and said pump to said vapor port, means for indicating water concentration in refrigerant in said path, and means coupled to said filter/dryer means for indicating operative condition of said filter/dryer means.

2. The system set forth in claim 1 wherein said condition-indicating means comprises differential pressure means connected across said filter/dryer means.

3. The system set forth in claim 4 wherein said apparatus is mounted on an L-shaped stand having a base and a back, said back including handle means at an upper edge thereof for manually transporting said apparatus.

4. Apparatus for purification of refrigerant within a storage container having separate liquid and vapor ports, said apparatus comprising filter/dryer means for removing water from refrigerant passing therethrough, a liquid refrigerant pump, means for removably connecting said filter/dryer means and said pump to said ports to circulate liquid refrigerant in a closed path from said liquid port through said filter/dryer means and said pump to said vapor port, and means in said path for indicating operative condition of said filter/dryer means.

5. The system set forth in claim 30 wherein said condition-indicating means comprises means for indicating water concentration in refrigerant in said path.

* * * * *

REEXAMINATION CERTIFICATE (2230th)
United States Patent [19]
Manz et al.

[11] B1 5,033,271

[45] Certificate Issued  Feb. 22, 1994

[54] REFRIGERANT RECOVERY AND PURIFICATION SYSTEM

[75] Inventors: Kenneth W. Manz, Paulding; Roger D. Shirley, W. Unity, both of Ohio

[73] Assignee: SPX Corporation, Muskegon, Mich.

Reexamination Request:
No. 90/003,088, Jun. 7, 1993

Reexamination Certificate for:
Patent No.: 5,033,271
Issued: Jul. 23, 1991
Appl. No.: 577,336
Filed: Sep. 4, 1990

Related U.S. Application Data

[62] Division of Ser. No. 528,252, May 24, 1990, Pat. No. 5,038,578, which is a division of Ser. No. 319,618, Mar. 3, 1989, Pat. No. 4,938,031, which is a division of Ser. No. 204,675, Jun. 9, 1988, Pat. No. 4,809,520, which is a division of Ser. No. 117,098, Nov. 4, 1987, Pat. No. 4,768,347.

[51] Int. Cl.⁵ ............................................. F25B 43/00
[52] U.S. Cl. ........................................ 62/125; 62/474
[58] Field of Search .................... 62/77, 149, 292, 474, 62/85, 195, 125, 129; 137/544; 210/195.1, 257.1

[56] References Cited
U.S. PATENT DOCUMENTS

4,261,178  4/1981  Cain .
4,476,688  10/1984  Goddard .
4,768,347  9/1988  Manz et al. .
4,805,416  2/1989  Manz et al. .
5,195,333  3/1993  Van Steenburgh, Jr. .

FOREIGN PATENT DOCUMENTS

209511  5/1984  German Democratic Rep. .

*Primary Examiner*—William E. Tapolcai, Jr.

[57] ABSTRACT

A refrigerant recovery system which includes a compressor having an input coupled through an evaporator and through a solenoid valve to the refrigeration system from which refrigerant is to be withdrawn, and an output coupled through a condenser to a refrigerant storage container. The evaporator and condenser are contained within a closed cylindrical canister for heat exchange and oil separation, the canister having an oil drain valve in the bottom. The refrigerant storage container is carried by a scale having a limit switch coupled to control electronics to prevent or terminate further refrigerant recovery when the container is full. The entire system, including the control electronics, is mounted on a two-wheel hand truck to facilitate transport to a job site such as a building air conditioning or heat pump system. Apparatus for purifying recovered refrigerant includes a replaceable core filter/dryer, and a liquid pump for circulating refrigerant from the liquid port of the storage container through the core and then to the container vapor port. A differential pressure gauge is connected across the filter/dryer to indicate need for core replacement. A moisture indicator displays water concentration in the refrigerant. The purification apparatus may be either separate from or combined with the recovery system.

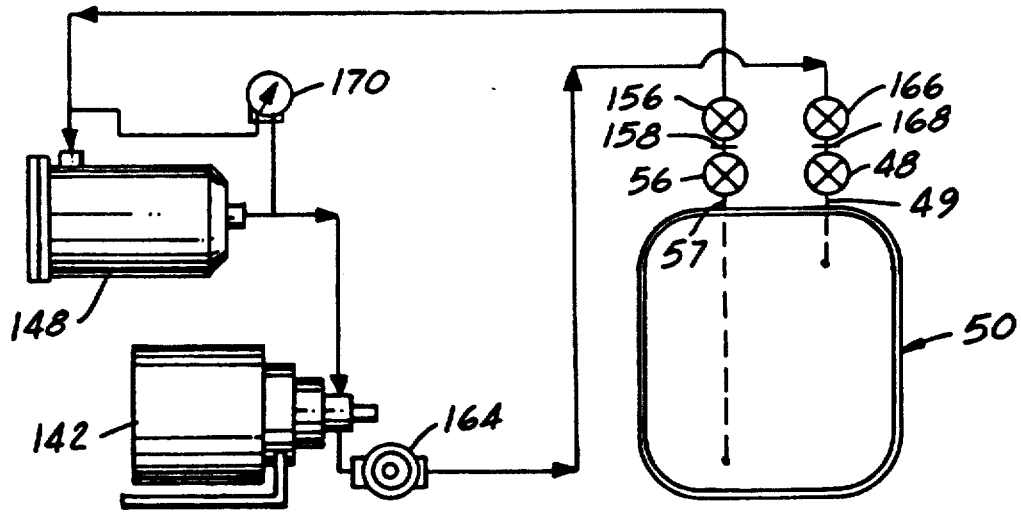

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 5 are determined to be patentable as amended.

Claims 2, 3, dependent on an amended claim, are determined to be patentable.

New claims 6, 7 are added and determined to be patentable.

1. Apparatus for purification of refrigerant within a *separate* storage container having separate liquid and vapor ports, said apparatus comprising filter/dryer means for removing water from refrigerant passing therethrough, a liquid refrigerant pump, means for removably connecting said filter/dryer means and said pump to [said] *the* ports *of a said storage container separate from said apparatus* to circulate liquid refrigerant in a closed path from said liquid port through said filter/dryer means and said pump to said vapor port, means for indicating water concentration in refrigerant in said path, and means coupled to said filter/dryer means for indicating operative condition of said filter/dryer means.

4. Apparatus for purification of refrigerant within a *separate* storage container having separate liquid and vapor ports, said apparatus comprising filter/dryer means for removing water from refrigerant passing therethrough, a liquid refrigerant pump, means for removably connecting said filter/dryer means and said pump to [said] *the* ports *of a said storage container separate from said apparatus* to circulate liquid refrigerant in a closed path from said liquid port through said filter/dryer means and said pump to said vapor port, and means in said path for indicating operative condition of said filter/dryer means.

5. The system set forth in claim [5] *4* wherein said condition-indicating means comprises means for indicating water concentration in refrigerant in said path.

*6. The system set forth in claim 1 wherein said removably connecting means comprise couplings for removable fastening to the container ports.*

*7. The system set forth in claim 4 wherein said removably connecting means comprise couplings for removable fastening to the container ports.*

* * * * *